(12) United States Patent
Ha et al.

(10) Patent No.: US 11,410,049 B2
(45) Date of Patent: Aug. 9, 2022

(54) COGNITIVE METHODS AND SYSTEMS FOR RESPONDING TO COMPUTING SYSTEM INCIDENTS

(71) Applicant: INTERNATIONAL BUSINESS MACHINES CORPORATION, Armonk, NY (US)

(72) Inventors: Eun Ha, Acton, MA (US); Naga Katreddi, Wexford, PA (US); Nisarga Markandaiah, Brooklyn, NY (US); Vishesh Raimugia, Durham, NC (US); Mary Swift, Rochester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 613 days.

(21) Appl. No.: 16/419,230

(22) Filed: May 22, 2019

(65) Prior Publication Data

US 2020/0372367 A1  Nov. 26, 2020

(51) Int. Cl.
*G06F 17/00* (2019.01)
*G06N 3/08* (2006.01)
*G06F 16/17* (2019.01)
*G06F 40/20* (2020.01)

(52) U.S. Cl.
CPC .......... *G06N 3/088* (2013.01); *G06F 16/1734* (2019.01); *G06F 40/20* (2020.01)

(58) Field of Classification Search
CPC .......... G06N 3/08; G06N 20/00; G06N 3/088; G06Q 10/06315; G06F 16/1734; G06F 40/20; G06F 11/3409; G06F 11/3476; G06F 11/3495; G06F 11/3452
See application file for complete search history.

(56) References Cited

U.S. PATENT DOCUMENTS

| | | | |
|---|---|---|---|
| 10,503,347 B2* | 12/2019 | Humayun | G06Q 50/01 |
| 10,860,451 B1* | 12/2020 | Murthy | G06F 11/079 |
| 2018/0083988 A1* | 3/2018 | Kataoka | H04L 63/1491 |
| 2018/0191753 A1* | 7/2018 | Lietz | G06F 21/50 |
| 2018/0233021 A1* | 8/2018 | Hiebert | G06F 9/45558 |
| 2018/0248906 A1* | 8/2018 | Scherman | H04L 63/1441 |
| 2018/0365417 A1* | 12/2018 | Wu | G06N 20/00 |
| 2018/0367561 A1* | 12/2018 | Givental | H04L 63/1408 |
| 2019/0007290 A1 | 1/2019 | He et al. | |
| 2019/0098037 A1* | 3/2019 | Shenoy, Jr. | H04W 12/12 |
| 2019/0108191 A1* | 4/2019 | Frank | G06F 16/9535 |
| 2019/0108470 A1* | 4/2019 | Jain | G06Q 10/20 |
| 2019/0349273 A1* | 11/2019 | Rikovic Tabak | G06K 9/6282 |
| 2020/0184355 A1* | 6/2020 | Mehta | H04L 41/16 |
| 2020/0192743 A1* | 6/2020 | Harper | G06F 11/0793 |

(Continued)

*Primary Examiner* — Laurie A Ries
(74) *Attorney, Agent, or Firm* — Griffiths & Seaton PLLC

(57) ABSTRACT

Embodiments for responding to computing system incidents are provided. Information associated with a computing system is analyzed to generate a base system model of the computing system. The information includes at least one of system logs and metrics data of the computing system. An indication of an incident associated with the computing system is received. The base system model is utilized to analyze the incident. The analysis of the incident includes characterizing the incident as a previously detected incident or an unknown incident. A strategy for responding to the incident is identified based on the analysis of the incident.

21 Claims, 6 Drawing Sheets

(56) References Cited

U.S. PATENT DOCUMENTS

| | | | |
|---|---|---|---|
| 2020/0226490 A1* | 7/2020 | Abdulaal | G06N 20/00 |
| 2020/0234212 A1* | 7/2020 | Garay | G06F 16/2465 |
| 2020/0328961 A1* | 10/2020 | Puri | H04L 43/16 |

* cited by examiner

500

```
{
name: "service-name-data-center-error-info",
time: Timestamp when alert was triggered,
alert-code: "Unique-Alert-type-identifer",
description: "Short context provided by the user, a more natural language way to describe the alert",
service-name: "Service that triggered this alert",
enviroment/kingdom/cluster: "Most services run in multiple clusters/zones/enviroment",
service_involved: "Which version of the service is running in the env/cluster",
log_messagage: "Log message captured from the logging service",
exception_message: "Exception stack trace captured from logging service",
approximate_eta: "Approximate estimated time to resolution based on previous alerts",
actual_resolution: "If available for this alert",
entities_involved:[
        "entity1",
        "entity2",
        "entity3",
        ... ],
anomaly_detected: true/false,
anomaly_detection_confidence: float,
playbook_entry: "If present, provide a quick link or a summary for the playbook entry this alert",
downstream_issue: true/false,
downstream_escalation_confidence: float value,
downstream_service_responder: "Name or id of the person who this issue should be re-assigned, null if false",
notes: "for example, examine the trigger for this alert when time permits and reconsidering the threshold for this alert type"
similar_open_alerts: [
        Alert_ID1,
        Alert_ID2,
        Alert_ID3,
        ... ],
similar_previous_alerts:[
        Alert_ID1,
        Alert_ID2,
        Alert_ID3,
        ... ],
}
```

FIG. 5

COGNITIVE METHODS AND SYSTEMS FOR RESPONDING TO COMPUTING SYSTEM INCIDENTS

BACKGROUND OF THE INVENTION

Field of the Invention

The present invention relates in general to computing systems, and more particularly, to various embodiments for responding to computing system or service incidents in an intelligent and/or automated manner.

Description of the Related Art

Due to the complexity of modern computing systems (and/or services), virtually continuous monitoring and support is required in the event of the occurrence of various incidents (e.g., software issues, hardware problems, security threats, etc.). This may particularly be an issue with, for example, cloud, and other internet-related, computing systems because of the widespread distribution of the resources utilized.

Often, this monitoring/support involves human responders (e.g., support staff, administrators, etc.), who are ideally ready to take action at any time (e.g., 24 hours per day, seven days a week, etc.). At a minimum, such a responsibility may be inconvenient and tasking, but it may also be stressful and disruptive. Additionally, in some places (e.g., some countries), regulations are in place that limit and/or prohibit requiring individuals to work at certain times (e.g., on holidays, nights, weekends, etc.).

SUMMARY OF THE INVENTION

Various embodiments for responding to computing system incidents are provided. Information associated with a computing system is analyzed to generate a base system model of the computing system. The information includes at least one of system logs and metrics data of the computing system. An indication of an incident associated with the computing system is received. The base system model is utilized to analyze the incident. The analysis of the incident includes characterizing the incident as a previously detected incident or an unknown incident. A strategy for responding to the incident is identified based on the analysis of the incident.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 5 illustrates an exemplary template for a log of a transaction according to an embodiment of the present invention.

DETAILED DESCRIPTION OF THE DRAWINGS

Figure 1:
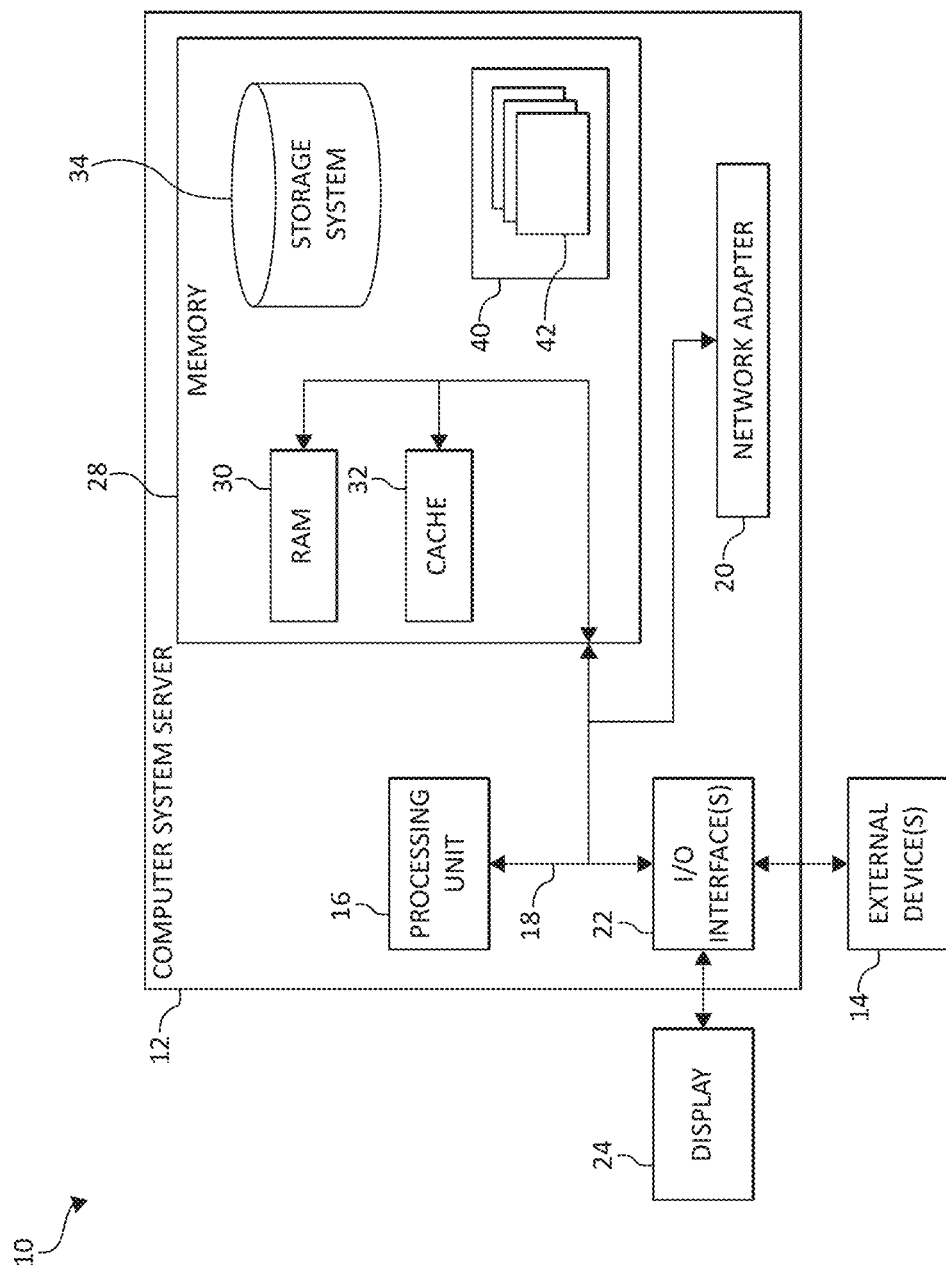
FIG. 1 is a block diagram depicting an exemplary computing node according to an embodiment of the present invention.

As discussed above, due to the complexity of modern computing systems/services, virtually continuous monitoring and support is required in the event of the occurrence of various incidents (e.g., software issues, hardware problems, security threats, etc.). This may particularly be an issue with, for example, cloud, and other internet-related, computing systems because of the widespread distribution of the resources utilized.

Often, this monitoring/support involves human responders (e.g., support staff, administrators, etc.), who are ideally ready to take action at any time (e.g., 24 hours per day, seven days a week, etc.). At a minimum, such a responsibility may be inconvenient and tasking, but it may also be stressful and disruptive. Additionally, in some places (e.g., some countries), regulations are in place that limit and/or prohibit requiring individuals to work at certain times (e.g., on holidays, nights, weekends, etc.).

Current solutions include, for example, event intelligence, which attempts to group alerts into incidents based on time or user behavior from "click" data, with the goal of reducing the state of concern by grouping multiple alerts into a single incident. Such systems may inform the user about similar past incidents, but recommended actions are not provided. Additionally, thresholds may be set based on priority and frequency to combat low priority alerts.

Some current solutions utilize voice enabled interfaces with incident alert software for hands-free interaction and/or may include systems that provide lists of existing configurations to a supervisor or administrator so that they may execute the appropriate response to the given conditions/incident. However, such systems provide no direct, automated incident response.

Other solutions may provide for a "bundling" of various types of actions to be executed via a single command (or button) in response to incident alerts. However, again, no direct, automated response to resolve the incidents is provided.

To address these needs and/or the shortcomings in the prior art, in some embodiments described herein, methods and/or systems are disclosed that provide for automated responding to computing system (e.g., cloud system/service/ technology) incident alerts by, for example, evaluating structured and unstructured data from system logs, metrics data, and "playbook" instructions (e.g., stored in a document and/or memory accessible by the incident response system).

In some embodiments, the methods and/or systems described herein group alerts based on multiple features extracted from metrics, logs, and dashboards using, for example, natural language processing and clusters them for better overall understanding of the situation. The system may learn from previous incidents to provide an approximate time for incident resolution and parse the playbook to find known actions to be taken and execute or recommend a possible resolution, as well as detect anomalies in the metrics or log data to escalate an issue or ignore it as a random, inconsequential event.

In some embodiments, the system may independently assess an appropriate response for an alert without human interaction (i.e., automatically). Additionally, the system may respond to incidents in multiple ways, not limited to executing pre-existing configurations, and perform a series of multiple intelligent operations if the initial response action is not successful. The response actions performed may be selected by, for example, analyzing structured and unstructured data in, for example, the logs and system dashboards.

The methods and/or systems may be referred to as, for example, an Intelligent Incident Response Assistant (IIRA) (or more simply as "incident response system(s)") and may be capable of handling incident alerts efficiently and automatically, thus relieving human responders from continuous monitoring duties. In some embodiments, the methods and/or systems may provide for standardized incident response actions and reporting.

In some embodiments, comprehensive automated incident response systems (and/or methods) are provided for incident alerts based on evaluating structured and unstructured data from system logs, metrics data, and playbook instructions. The incident response system(s) may utilize unsupervised anomaly detection using features (or data) from system logs and metrics dashboards (and/or data). The system may also utilize (or provide) a strategy for clustering alerts with their solutions such that future alerts may be categorized into preexisting alert "buckets," allowing for resolutions to be quickly identified.

In some embodiments, the incident response system (also) computes (or calculates) an estimated time to resolve incidents based on previous incidents (e.g., similar incidents). Further, the system may provide (or store) detailed data related to incidents that may be used to improve system performance (e.g., the amount of time taken to resolve different occurrences/instances of similar incidents, which may be utilized to identify "bottlenecks" in the operation of the system).

The methods and systems described herein may help conserve human resources by relieving responsibilities for continuous human monitoring of system performance so human responders may focus on tasks that require their expertise. The response time for time-critical issues, such as customer impacting events, may be improved via the instant, automated incident handing described herein. Additionally, the response times for incidents in which human intervention is required may be improved due to the logging of incident details. Incident logging may also be improved across multiple services or subsystems with standardized reporting. The development of human stress assessment evaluations based on the alert logs may also be enabled. An increased number of incidents/alerts may also be able to be supported because the monitoring, responding, and reporting are automated. Alert patterns over time may be detected, and anomalies may be flagged (e.g., a low priority alert that appears frequently indicates that the trigger should be inspected and the alert threshold possibly adjusted). The human resources required for support/monitoring are reduced, as is the amount of human coding to specify logic for resolving incident alerts. Resource planning may also be improved by reporting estimated time for incidents to be resolved.

In some embodiments, the incident response systems (and/or methods) described herein utilize (and/or include) a cognitive module (or subsystem) to automatically respond to incident alerts. For example, the cognitive module may monitor (and/or collect) structured and unstructured data associated with the operation of the computing system (or service), such as metrics, dashboards, various logs, and playbooks associated with the computing system to detect alerts and determine appropriate actions to resolve the alerts, if available. In some embodiments, the systems utilize natural language processing (NLP) techniques, such as classifying natural language (e.g., scanning for keywords, key phrases, other NLP techniques, etc.) with respect to, for example, incident alerts and/or any other available data sources.

If the incident system determines that no appropriate action is available (or known), the alert may be "escalated" and/or reassigned (e.g., appropriate human responders may be provided with an indication of the alert so that they may handle the situation). In some embodiments, regardless of how the alert is handled, a detailed report of the incident is logged (e.g., detailed information about the incident is stored for future use). The system may utilize the collected data to compute (or calculate) an estimate time for incidents to be resolved and compare the handling of different occurrences of similar incidents over time.

In some embodiments, the system (e.g., the cognitive module), or at least particular aspects of operation thereof, is trained via an unsupervised learning method. As will be appreciated by one skilled in the art, unsupervised learning is a branch of machine learning (or cognitive analysis) that learns from data that has not been labeled, classified, or categorized. That is, instead of responding to feedback, unsupervised learning identifies commonalities in the data and reacts based on the presence or absence of such commonalities in each new piece of data.

As such, in some embodiments, the methods and/or systems described herein may utilize a "neural network," "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, to analyze computing system incidents and the resolution thereof, as described herein. Utilizing the models, the performance (or operation) of the system (e.g., utilizing/based on new inputs) may be predicted and/or the performance of the system may be optimized by investigating how changes in the input(s) effect the output(s).

It should be understood that as used herein, the term "computing node" (or simply "node") may refer to a computing device, such as a mobile electronic device or a desktop computer, and/or an application, such as a chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for responding to computing system (or service) incidents, by a processor, is provided. Information associated with a computing system is analyzed to generate a base system model of the computing system. The information includes at least one of system logs and metrics data of the computing system. An indication of an incident associated with the computing system is received. The base system model is utilized to analyze the incident. The analysis of the incident includes characterizing the incident as a previously detected incident or an unknown incident. A strategy for responding to the incident is identified based on the analysis of the incident.

An estimated time to resolve the incident may be calculated. An indication of the estimated time may be generated. Information associated with the incident may be stored.

The strategy for responding to the incident may include at least one of a restart of at least a subsystem of the computing system, generating a notification of the incident, and assigning the incident to an entity associated with the computing system. The strategy for responding to the incident may (also) include selecting the strategy from a plurality of strategies previously utilized for responding to previous incidents.

The analysis of the incident may include performing natural language processing on the received indication of the incident and/or the characterizing of the incident may be performed utilizing an unsupervised learning method. The strategy for responding to the incident to be executed may be (automatically) caused to be executed.

It is understood in advance that although this disclosure includes a detailed description on cloud computing, implementation of the techniques recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
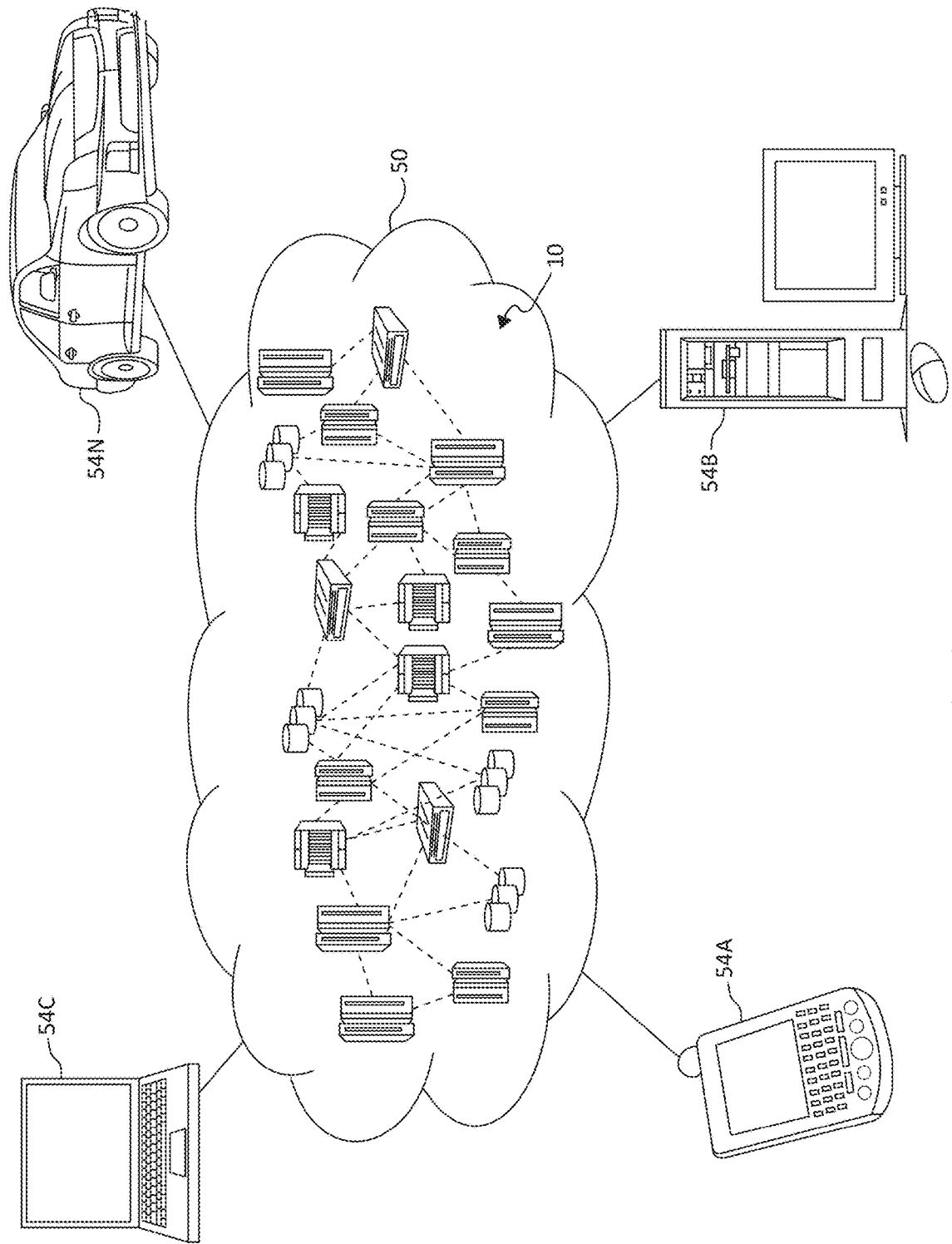
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
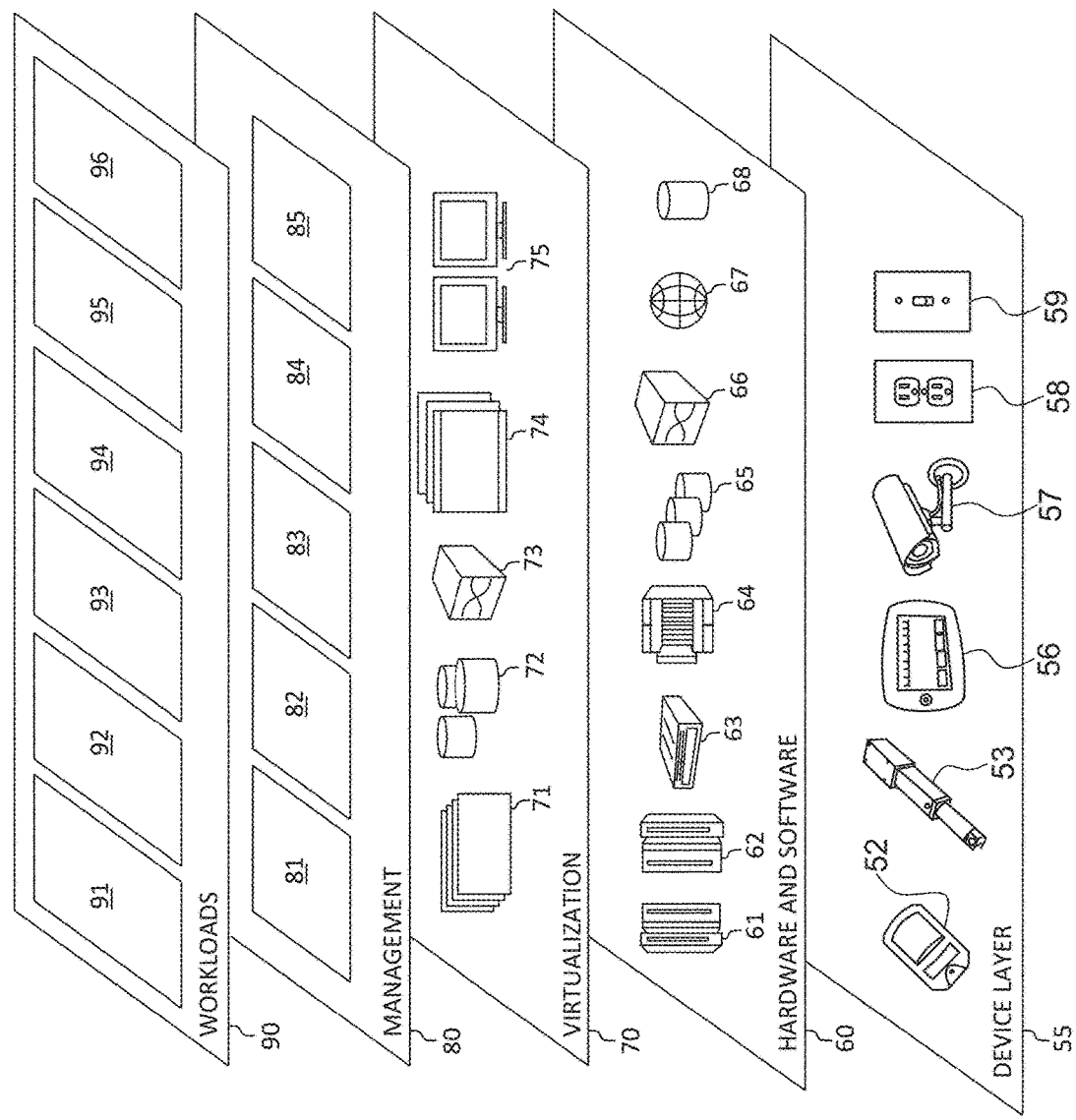
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for responding to computing system (and/or service) incidents, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, some embodiments described herein provide systems and/or methods (e.g., incident response systems/methods) that provide for automated responding to computing system and/or service (e.g., cloud system/technology) incident alerts by, for example, evaluating structured and unstructured data from system logs, metric dashboards, and "playbook" instructions. In some embodiments, the methods and/or systems described herein, group alerts based on multiple features extracted from metrics, logs, and dashboards using, for example, natural language processing and clusters them for better overall understanding of the situation. The system may learn from previous incidents to provide an approximate time for incident resolution and parse the playbook to find known actions to be taken and execute or recommend a possible resolution, as well as detect anomalies in the metrics or log data to escalate an issue or ignore it as a random, inconsequential event. In some embodiments, the system may independently assess an appropriate response for an alert without human interaction (i.e., automatically). Additionally, the system may respond to incidents in multiple ways, not limited to executing pre-existing configurations, and perform a series of multiple intelligent operations if the initial response action is not successful.

In some embodiments, the systems (and/or methods) described herein are capable of automatically responding to incident alerts. The system may use structured and unstructured data associated with a computing system (or service), such as metrics, dashboards, logs, playbooks, etc. to detect an alert and determine the appropriate actions to resolution (i.e., if available). If no appropriate action is found, the system may escalate and/or reassign the alert. In some embodiments, regardless of how the system handles an alert, a detailed report of the incident is logged (or saved/stored). The data collected may be used to compute or estimate a time for incident resolution and compare handling of different occurrences of similar incidents over time.

In some embodiments, unsupervised anomaly detection (or unsupervised learning) may be performed using, for example, structured and unstructured data. The unsupervised learning may utilize, for example, a k-nearest neighbor (k-NN) algorithm or technique for a cluster analysis, as are commonly understood, which may be applied to features (or data) collected from, for example, the computing system dashboards, metrics, logs, etc. For example, the system may cluster alerts within a particular time window (or frame) to establish whether or not the alerts were triggered by a common high level issue, such as a major problem with the underlying computing system resources (e.g., cloud infrastructure).

The utilization of unsupervised learning may allow the system to identify anomalous patterns without the need for training with labeled data (e.g., because different computing systems/services may have different interpretations of a particular anomaly). For example, a number of "503 errors" (i.e., service unavailable errors) may not be considered an anomaly. However, a single 503 error among multiple "503 errors" (i.e., failed server) may be classified as an anomaly. As another example, a metric that tracks a number of "200 response" codes (i.e., a request is being processed) for an Application Programming Interface (API) endpoint might be having an issue with a low number of 200 response codes.

In some embodiments, the system utilizes natural language processing techniques (e.g., parsing and Named Entity Recognition) to, for example, extract relevant information in descriptions of alerts and the known action items in the playbook to find entities that are present or associated with the alerts (i.e., alerts with similar entities may be experiencing issues with similar services, resources, etc). For example, if alerts come from different services and have descriptions and action items with entities such as HTTP, network, and connectivity, such may indicate that the incident is due to a network issue on the cluster where their services reside.

In some embodiments, the system also uses NLP techniques to parse and analyze unstructured log data of the computing system or service. This may be particularly useful in cases where incident alerts are not generated by metrics (or other similar data) but from analyzing code (e.g., no metrics are available). The system may parse text in message/log fields and identify features such as entities that are involved with the error, the file/line number where the error occurred, and the "timestamp" field to group error messages. The system may also utilize information associated with the cluster where the service (or computing system) is operating to, for example, detect if other services running on the same cluster are experiencing similar issues.

In some embodiments, the systems (and/or methods) described herein provide (and/or are configured to perform) various functionality related to responding to incidents. The system may continuously monitor computing systems (and/or services), detect service (or system) alerts, and assess alert priority (e.g., high, low, etc.) based on, for example, known alert codes.

Alert frequency may also be assessed to determine whether or not particular incidents are "random" (or "one-off") or part of a series of incidents (or related incidents) that occur within a particular timeframe utilizing methods to detect, for example, specific alert times and error messages in the system dashboard, and parsing errors in the logs for analysis. If the incident is determined to be a one-off event, the issue may be resolved and a log with details thereof may be generated and stored, as described below. If the incident(s) is determined to be, for example, part of a pattern of relatively frequent low-priority alerts based on classification techniques applied to context features from the dashboard and logs, the incident may be "snoozed" (e.g., alerts of the incident(s) are stopped for an amount of time) or resolved. A log of the incident may be generated and stored, perhaps incorporating a suggestion for examining the trigger for the alert when time permits and reconsidering the threshold for this alert type.

The system may determine if points of delivery (PODs) are functioning properly. If PODs (or other workloads) are determined to not be functioning properly, the system may restart (or at least attempt to restart) the PODs and monitor them for a successful (re)start. If the system is not able to restart any PODs, the incident may be escalated and a log of the incident may be stored. In some instances, replica PODs may not be functioning properly even if the appropriate tests appear to be passed (i.e., from functioning replicas). In such instances, the system may check, for example, kube-state-metrics for some platforms, as is commonly understood in the art, to verify how many PODs are available. However, other checks may be utilized for other platforms.

In some embodiments, the system evaluates structured and/or unstructured data in a playbook to identify appropriate actions to resolve incidents. For example, if an alert is received with respect to uptime checks, the system may search the playbook for appropriate actions. If an appropriate action is found, it may be (automatically) executed (or implemented, utilized, etc.) according to the playbook to resolve the alert, and an appropriate log may be stored. If an appropriate action is not identified in the playbook, the alert may be escalated (e.g., a notification may be generated and provided to an appropriate human responder), an appropriate log may be stored, and a notification regarding adding the incident to the playbook may be generated (e.g., and sent to appropriate personnel and/or automatically added to the playbook).

In some embodiments, actions taken by the system in response to incidents may include, for example, acknowledgement, reassignment, escalation, resolution, and snoozing. With respect to acknowledgment, the system may be configured to acknowledge (e.g., generate a simple notification of) the detection of an incident alert. However, such an initial step may not be utilized (i.e., it may be considered to be unnecessary) if the incident can be resolved quickly. Regarding reassignment, if the alert is related to a service that is different than what the available playbook(s) is designed for (and/or no solutions are found in the playbook(s)), the incident may be reassigned to particular human responders (e.g., a Site Reliability Engineer (SRE) or other personnel). Similarly, the alert may be escalated if no appropriate solutions are identified in the playbook by, for example, generating an appropriate notification (e.g., an electronic communication) and providing it to appropriate personnel. As described above, if an appropriate solution is found in the playbook, the incident may be resolved, and if multiple, similar low-priority alerts arise within a particular timeframe, the incident(s) may be snoozed.

As described above, in some embodiments, the system computes (or calculates) an estimated time to resolve the incident(s). The estimated time may be determined based on previous alerts/incidents of similar types. For example, the estimated time may be calculated as an average of the previous N alerts of the same (or similar) type. In some embodiments, a more sophisticated computation of the estimated time may be utilized, such as by taking into account whether or not the time to resolution was affected by the performance of required components.

With respect to generating logs of the incident responses, in some embodiments, the system utilizes a template that encodes information related to the incidents, such as the alert (e.g., name of the alert), the trigger of the alert, entry point, action(s) taken, time to resolve, etc. In some embodiments, open-standard file formats are used.

Figure 4:
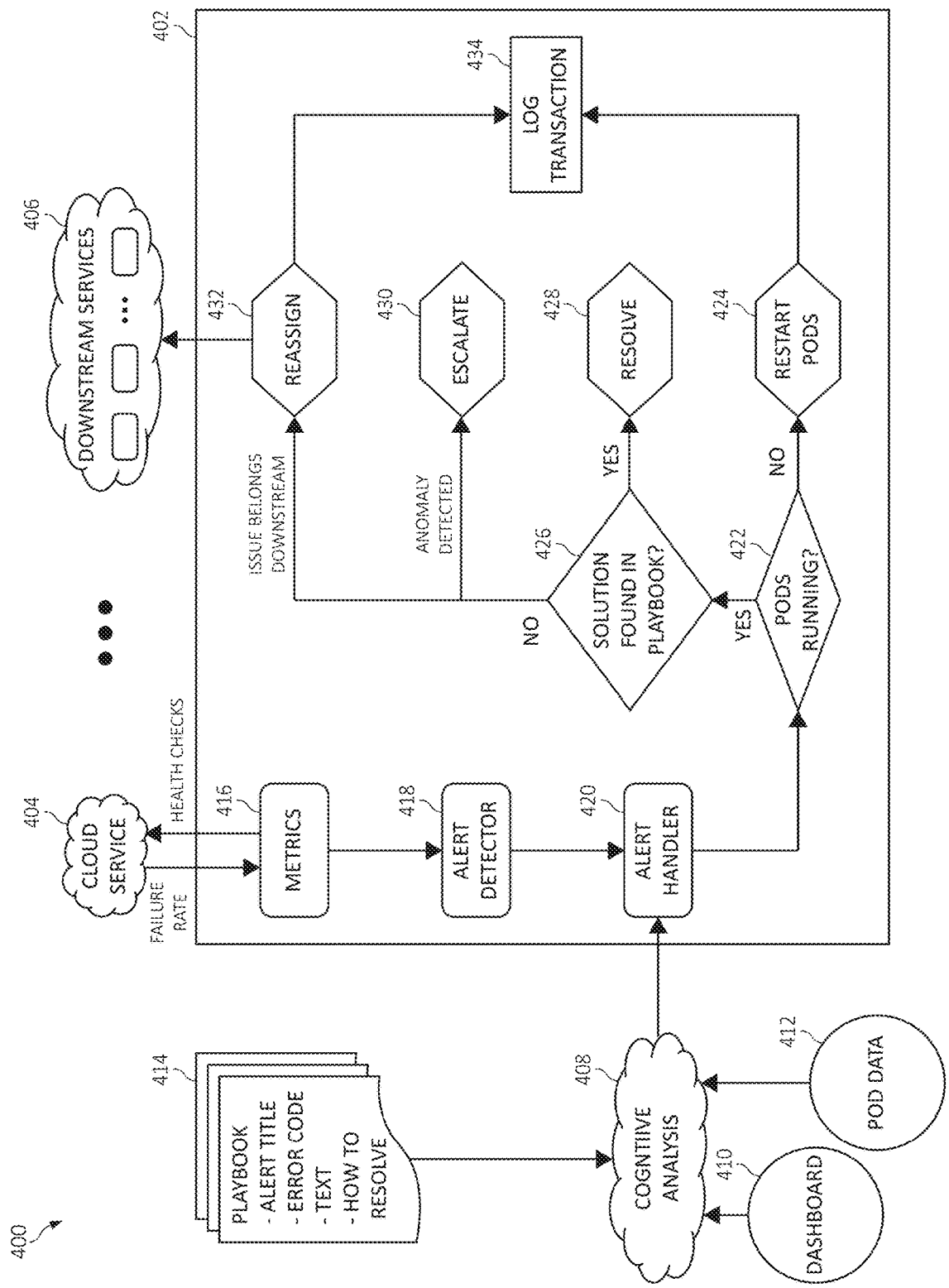
FIG. 4 is a block diagram/flow chart of a computing environment including an incident response system according to an embodiment of the present invention.

FIG. 4 illustrates a computing environment 400 in which the incident response systems (and/or methods) described herein may be utilized. As shown, within the environment 400 are an incident response system (or subsystem or module) 402, a cloud service 404, downstream services 406, a cognitive analysis module 408, a dashboard 410, POD data 412, and a playbook 414. Each of the components 402-414 shown in FIG. 4 may be implemented with and/or stored on any suitable computing device, such as those described above. It should also be understood that some of the components may be local to each other (i.e., implemented at the same site and/or integrated into the same computing system) and/or remote from one another (i.e., in operable communication via any suitable communication network).

The cloud service 404 may be any suitable computing service (or system) that is being monitored by the incident response system 402 as described herein. As such, it should be noted that the embodiments described herein may be applied to the monitoring of incidents related to the operation of any suitable computing system or network (i.e., not necessarily related to cloud technology). The downstream services 406 may be any ancillary computing resources, including human responders, related to, for example, the support and/or maintenance of the cloud service 404.

The cognitive analysis module (or cognitive module) 408 may include any computing system (or portion thereof) that is configured to perform the cognitive analysis or machine learning techniques (e.g., unsupervised learning) described herein. Although the cognitive module 408 is shown as a component separate from the incident response system 402, it should be noted that in some embodiments it may be integrated into the same computing system as the incident response system 402.

The dashboard 410 and POD data 412 may include (and/or generate, store, etc.) any suitable information related to (current or past) status, operation, incidents, resolution of incidents, etc. of the cloud service 404, PODs, and/or any other computing service/system that is utilized by the cognitive module 408 and/or the incident response system 402 to perform the functionality described herein. The playbook 414 may include any information related to resolving incidents, alerts, etc., such as the name/titles of alerts, error codes associated with the alerts, text/comments related to resolving the incidents, and instructions on how to resolve incidents, which may (also) be utilized by the cognitive module 408 and/or the incident response system 402 to perform the functionality described herein (although the playbook 414 may also be accessible and/or utilized by human responders).

In the embodiment shown in FIG. 4, the incident response system 402 includes a metrics module 416, an alert detector 418, and an alert handler 420. The metric module 416 may perform "health checks" on the cloud service 404 (e.g., request information, metrics, etc. related to the status, operation, etc. of the cloud service) and receive such information (e.g., related to failures, incidents, etc.) from the cloud service 404. This information may be sent to (and/or received/accessed by) the alert detector 418. Depending on the information received, the alert detector 418 may generate an indication of an incident or alert (and/or receive such from other components, such as the metric module 416 or the cloud service 404). The alert handler 420 may provide any appropriate information (e.g., alert title, error code, etc.) to the cognitive module 408, which may, for example, utilize the cognitive analysis described herein. For example, the cognitive module 408 (and/or the alert handler 420) may compare the alert to previous incidents associated with the operation of the cloud service 404 and/or other computing systems and/or other information found in the dashboard 410 and/or POD data 412 to, for example, generate a base system model for the cloud service 404 (perhaps before the alert is detected) and/or other computing systems/services and characterize the incident as a previously detected incident or an unknown incident. The alert handler 420 (and/or the cognitive module 408) may then determine the appropriate course of action for the alert.

In the depicted embodiment, the alert handler 420 (and/or the cognitive module 408) first determines whether or not the appropriate PODs are operating (or running) at block 422. As shown, if the PODs are not running, the alert handler 402 restarts (or attempts to restart, generates an appropriate signal/request to cause a restart of) the PODs at block 424. If the PODs are determined to be running, at block 426, the alert handler 420 determines whether or not an appropriate solution is available (or found) in the playbook 414.

If an appropriate solution is found in the playbook, at block 428, the incident is resolved utilizing the appropriate solution. If an appropriate solution is not found in the playbook, the alert (or incident) is escalated at block 430 (e.g., if an anomaly is detected and/or if the alert is determined to be high priority) and/or reassigned at block 432 (e.g., if the incident is determined to be suitable for one of more of the downstream services 406). As shown in FIG. 4, regardless of how the alert is handled, a log of the transaction (or the appropriate details of the alert and the manner in which the alert has handled/responded to) is generated (and stored on a memory). Although not shown, the log may be sent to and/or accessible by other components shown in FIG. 4, such as the cognitive module 408 (and/or the dashboard 410, the POD data 412, and/or the playbook 414). As such, the log of the transaction may be utilized by the cognitive module 408 (and/or alert handler 420) for responding to future alerts. As one example, a JavaScript Object Notation (JSON) template may be utilized for the log, such as the template 500 shown in FIG. 5.

Referring again to FIG. 4, as described above, in some embodiments, the incident response system 402 (and/or the alert handler 420) may also calculate an estimated time to resolve the incident. A notification (e.g., electronic message)

of the estimated time may be generated and provided to appropriate individuals (e.g., customers, human responders, etc.).

Figure 6:
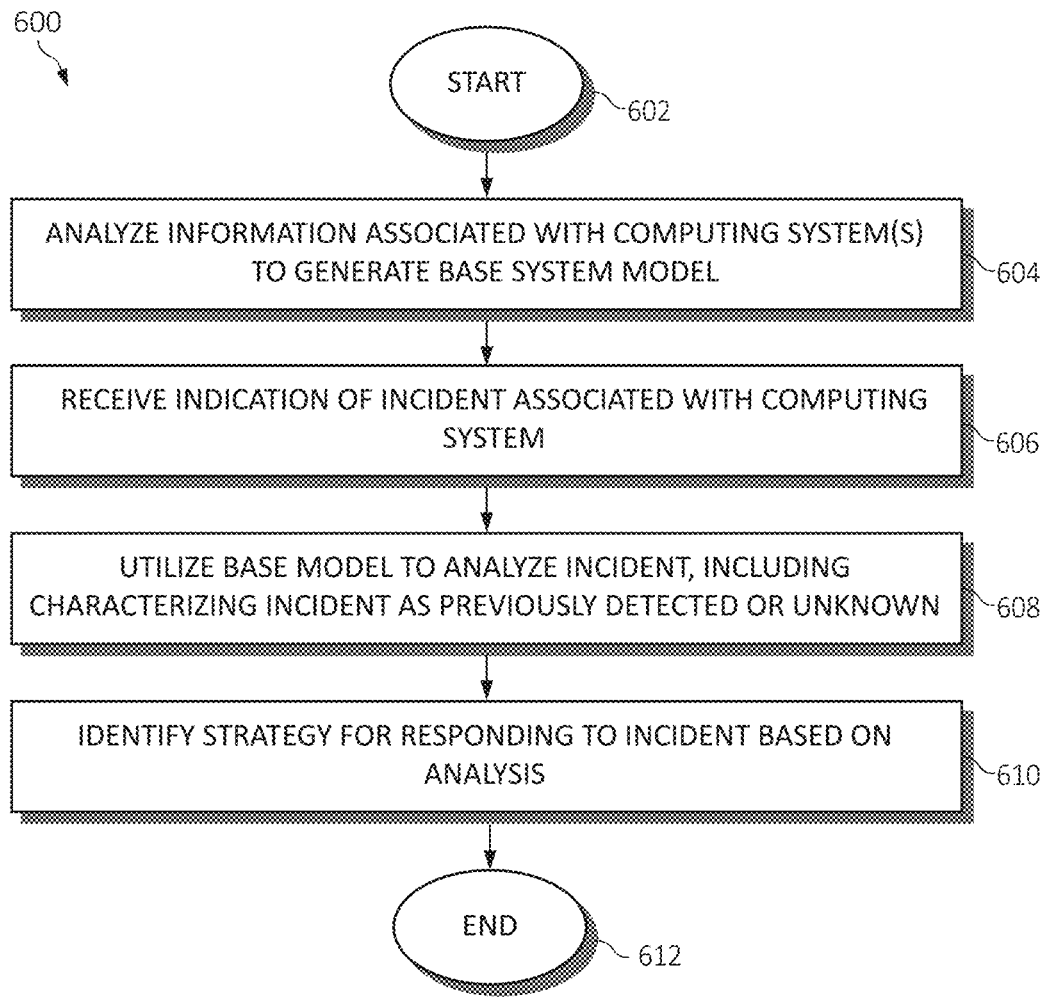
FIG. 6 is a flowchart diagram of an exemplary method for responding to computing system incidents according to an embodiment of the present invention.

Turning to FIG. 6, a flowchart diagram of an exemplary method 600 for responding to computing system (or service) incidents, by one or more processors, is provided. The method 600 begins (step 602) with, for example, information associated with previous incidents (or alerts) associated with one or more computing systems being made accessible by a cognitive module and/or a particular computing system/service being monitored, as described above. The information may include, for example, the name/titles of previous alerts, the entities involved, the manner in which the alerts were handled, or any other information described above, such as available on system logs, metrics data, etc.

The information associated with the computing system(s) is analyzed to generate a base system model of the computing system(s) (step 604). The base system model may be associated with a particular computing system/service being monitored and/or other computing systems/services (i.e., other systems/services utilized in the cognitive analyses described herein).

An indication of an incident associated with the computing system is received (or generated) (step 606). The indication includes and/or is based on information in the metrics, dashboards, etc. of the computing system being monitored.

The base system model is utilized to analyze the incident (step 608). The analysis of the incident may include characterizing the incident as a previously detected incident or an unknown incident. The analysis of the incident may include performing natural language processing on the received indication of the incident. The characterizing of the incident may be performed utilizing an unsupervised learning method (and/or cognitive analysis), as described above.

A strategy for responding to the incident is identified based on the analysis of the incident (step 610). The strategy for responding to the incident may include at least one of a restart of at least a subsystem (e.g., PODs) of the computing system, generating a notification of the incident, assigning the incident to an entity (e.g., human responders) associated with the computing system, and/or selecting the strategy from a plurality of strategies previously utilized for responding to previous incidents.

Method 600 ends (step 612) with, for example, the selected strategy for responding to the incident being executed. In some embodiments, an estimated time to resolve the incident may be calculated, and an indication of the estimated time may be generated, as described above. Additionally, information (e.g., a log) associated with the incident may be stored. The information may be utilized by the system (e.g., via unsupervised learning) in responding to future incidents. Further, in some embodiments, feedback from users may also be utilized to improve the performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for responding to computing system incidents, by a processor, comprising:
analyzing information associated with a computing system to generate a base system model of the computing system, wherein the information comprises at least one of system logs and metrics data of the computing system;
receiving an indication of an incident associated with the computing system, wherein the incident is identified by detecting unlabeled anomalous data in the information notwithstanding whether the anomalous data is included in the base system model;
utilizing the base system model to analyze the incident, wherein the analysis of the incident includes characterizing the incident as a previously detected incident or an unknown incident; and
identifying a strategy for responding to the incident based on the analysis of the incident.

2. The method of claim 1, further comprising:
calculating an estimated time to resolve the incident; and
generating an indication of the estimated time.

3. The method of claim 1, wherein the strategy for responding to the incident comprises at least one of a restart of at least a subsystem of the computing system, generating a notification of the incident, and assigning the incident to an entity associated with the computing system.

4. The method of claim 1, wherein the strategy for responding to the incident comprises selecting the strategy from a plurality of strategies previously utilized for responding to previous incidents.

5. The method of claim 1, further comprising storing information associated with the incident.

6. The method of claim 1, wherein the analysis of the incident comprises performing natural language processing on the received indication of the incident, the characterizing of the incident is performed utilizing an unsupervised learning method, or a combination thereof.

7. The method of claim 1, further comprising causing the strategy for responding to the incident to be executed.

8. A system for responding to computing system incidents comprising:
a processor executing instructions stored in a memory device, wherein the processor:
analyzes information associated with a computing system to generate a base system model of the computing system, wherein the information comprises at least one of system logs and metrics data of the computing system;
receives an indication of an incident associated with the computing system, wherein the incident is identified by detecting unlabeled anomalous data in the information notwithstanding whether the anomalous data is included in the base system model;
utilizes the base system model to analyze the incident, wherein the analysis of the incident includes characterizing the incident as a previously detected incident or an unknown incident; and
identifies a strategy for responding to the incident based on the analysis of the incident.

9. The system of claim 8, wherein the processor further:
calculates an estimated time to resolve the incident; and
generates an indication of the estimated time.

10. The system of claim 8, wherein the strategy for responding to the incident comprises at least one of a restart of at least a subsystem of the computing system, generating a notification of the incident, and assigning the incident to an entity associated with the computing system.

11. The system of claim 8, wherein the strategy for responding to the incident comprises selecting the strategy from a plurality of strategies previously utilized for responding to previous incidents.

12. The system of claim 8, wherein the processor further stores information associated with the incident.

13. The system of claim 8, wherein the analysis of the incident comprises performing natural language processing on the received indication of the incident, the characterizing of the incident is performed utilizing an unsupervised learning method, or a combination thereof.

14. The system of claim 8, wherein the processor further causes the strategy for responding to the incident to be executed.

15. A computer program product for responding to computing system incidents, by a processor, the computer program product embodied on a non-transitory computer-readable storage medium having computer-readable program code portions stored therein, the computer-readable program code portions comprising:

an executable portion that analyzes information associated with a computing system to generate a base system model of the computing system, wherein the information comprises at least one of system logs and metrics data of the computing system;

an executable portion that receives an indication of an incident associated with the computing system, wherein the incident is identified by detecting unlabeled anomalous data in the information notwithstanding whether the anomalous data is included in the base system model;

an executable portion that utilizes the base system model to analyze the incident, wherein the analysis of the incident includes characterizing the incident as a previously detected incident or an unknown incident; and an executable portion that identifies a strategy for responding to the incident based on the analysis of the incident.

16. The computer program product of claim 15, wherein the computer-readable program code portions further include:

an executable portion that calculates an estimated time to resolve the incident; and an executable portion that generates an indication of the estimated time.

17. The computer program product of claim 15, wherein the strategy for responding to the incident comprises at least one of a restart of at least a subsystem of the computing system, generating a notification of the incident, and assigning the incident to an entity associated with the computing system.

18. The computer program product of claim 15, wherein the strategy for responding to the incident comprises selecting the strategy from a plurality of strategies previously utilized for responding to previous incidents.

19. The computer program product of claim 15, wherein the computer-readable program code portions further include an executable portion that stores information associated with the incident.

20. The computer program product of claim 15, wherein the analysis of the incident comprises performing natural language processing on the received indication of the incident, the characterizing of the incident is performed utilizing an unsupervised learning method, or a combination thereof.

21. The computer program product of claim 15, wherein the computer-readable program code portions further include an executable portion that causes the strategy for responding to the incident to be executed.

* * * * *